US011972887B2

(12) United States Patent
Noya et al.

(10) Patent No.: US 11,972,887 B2
(45) Date of Patent: Apr. 30, 2024

(54) INDUCTOR COMPONENT

(71) Applicant: Murata Manufacturing Co., Ltd., Kyoto-fu (JP)

(72) Inventors: Sunao Noya, Nagaokakyo (JP); Akira Tanaka, Nagaokakyo (JP); Koji Okuda, Nagaokakyo (JP); Tomotaka Gotohda, Nagaokakyo (JP)

(73) Assignee: Murata Manufacturing Co., Ltd., Kyoto-fu (JP)

( * ) Notice: Subject to any disclaimer, the term of this patent is extended or adjusted under 35 U.S.C. 154(b) by 867 days.

(21) Appl. No.: 16/892,004

(22) Filed: Jun. 3, 2020

(65) Prior Publication Data

US 2021/0005373 A1 Jan. 7, 2021

(30) Foreign Application Priority Data

Jul. 4, 2019 (JP) ................................ 2019-125448

(51) Int. Cl.
*H01F 17/04* (2006.01)
*H01F 27/28* (2006.01)
*H01F 27/29* (2006.01)

(52) U.S. Cl.
CPC ....... *H01F 17/045* (2013.01); *H01F 27/2804* (2013.01); *H01F 27/2823* (2013.01); *H01F 27/2828* (2013.01); *H01F 27/292* (2013.01)

(58) Field of Classification Search
CPC .................................................. H01F 27/2804
USPC ......................................................... 336/221
See application file for complete search history.

(56) References Cited

U.S. PATENT DOCUMENTS

2005/0145408 A1* 7/2005 Hess .................... H05K 3/3442 174/541
2010/0182115 A1* 7/2010 Huang .................. H01F 17/045 336/83
2012/0133469 A1* 5/2012 Tomonari .............. H01F 27/292 336/192
2015/0035635 A1 2/2015 Hayashi et al.
2017/0025208 A1* 1/2017 Chang ..................... H01F 17/04
2017/0125157 A1 5/2017 Hess et al.
2017/0263372 A1 9/2017 Ashizawa et al.
(Continued)

FOREIGN PATENT DOCUMENTS

JP 2006253394 A 9/2006
JP 2011-082463 A 4/2011
(Continued)

OTHER PUBLICATIONS

An Office Action; "Notice of Reasons for Refusal," mailed by the Japanese Patent Office dated Mar. 22, 2022, which corresponds to Japanese Patent Application No. 2019-125448 and is related to U.S. Appl. No. 16/892,004 with English language translation.

*Primary Examiner* — Ronald Hinson
(74) *Attorney, Agent, or Firm* — Studebaker & Brackett PC

(57) ABSTRACT

An inductor component that includes a core that includes a substantially column-shaped shaft part and a pair of support parts at both ends of the shaft part; terminal electrodes that are respectively provided on the pair of support parts; and a wire that is wound around the shaft part and has end portions that are respectively connected to the terminal electrodes on the pair of support parts. The inductor component exhibits an impedance value of 2100Ω or higher for an input signal having a frequency of 500 MHz.

33 Claims, 7 Drawing Sheets

(56) References Cited

U.S. PATENT DOCUMENTS

| | | | | |
|---|---|---|---|---|
| 2018/0247751 | A1 | 8/2018 | Noya et al. | |
| 2018/0286554 | A1* | 10/2018 | Kojima ................. | H01F 17/045 |
| 2018/0366255 | A1* | 12/2018 | Mikogami .............. | H01F 27/24 |
| 2018/0374632 | A1* | 12/2018 | Kawahara ........... | H01F 27/2823 |

FOREIGN PATENT DOCUMENTS

| | | | |
|---|---|---|---|
| JP | 2015-032643 | A | 2/2015 |
| JP | 3204112 | U | 5/2016 |
| JP | 2017-163026 | A | 9/2017 |
| JP | 2018-142644 | A | 9/2018 |

* cited by examiner

INDUCTOR COMPONENT

CROSS-REFERENCE TO RELATED APPLICATION

This application claims benefit of priority to Japanese Patent Application No. 2019-125448, filed Jul. 4, 2019, the entire content of which is incorporated herein by reference.

BACKGROUND

Technical Field

The present disclosure relates to an inductor component.

Background Art

Japanese Unexamined Patent Application Publication No. 2006-253394 discloses an inductor component of the related art. This inductor component includes a core, terminal electrodes that are provided on the core, a wire that is wound around the core and connected to the terminal electrodes, and a magnetic-powder-containing resin that covers the wire.

The inductance of the inductor component can be improved by improving the magnetic efficiency using the magnetic-powder-containing resin. Consequently, the number of turns of the wire can be made smaller than usual and copper loss can also be reduced and as a result the Q characteristic can be improved while reducing the size of the overall shape of the inductor component.

Realization of a high Q characteristic is an issue in inductor components used in signal systems such as the above-described inductor component of the related art and how to maintain a high Q characteristic in spite of changes in the use environment such as miniaturization and the use of higher signal frequencies has been the focus of technological development.

From the viewpoint of maintaining a high Q characteristic in spite of miniaturization and the use of higher frequencies, the efficiency with which an inductance value is obtained, specifically, how to maintain the same inductance value as was previously possible while using a smaller number of turns of the wire is important, and for example, in the inductor component of the related art described above, an attempt was made to achieve this objective by using a magnetic-powder-containing resin.

However, the inventors of the present application focused on the fact that the impedance value in a low-frequency region has not been considered in the technological development of signal-system inductor components such as the inductor component of the related art described above. Specifically, in terms of obtaining the inductance value, the inductance value is more highly dependent on the number of turns of the wire and the copper loss (resistance component) is more significantly reduced by a reduction in the number of turns in a low-frequency region than in a high-frequency region, and therefore it was discovered that a satisfactory inductance value could not be obtained in a low-frequency region with the signal-system inductor component of the related art. In other words, the signal inductor component of the related art is not suitable for use in a low-frequency region.

It is possible to secure an impedance value in a low-frequency region such as the 1 MHz band by using a method opposite to that used in the inductor component of the related art, but in this case, there will be a trade off in terms of the impedance value in a high-frequency region.

SUMMARY

Accordingly, the present disclosure provides an inductor component that is suitable for use in a specific low-frequency region and can reduce the effect on use in a high-frequency region.

The inventors of the present application discovered that although the 500 MHz band is recognized as a low-frequency region in the field of signal systems, improving the impedance value in the 500 MHz band does not result in a significant trade off with respect to improving the impedance value in a high-frequency region such as the 1 GHz band. This is thought to be because the mechanisms for improving the impedance value (the behavior of the LCR components of the inductor component with respect to an AC signal) are similar in the 500 MHz band and the 1 GHz band. Thus, the inventors of the present application conceived of an inductor component of the present disclosure.

Therefore, an inductor component according to a preferred embodiment of the present disclosure includes a core that includes a substantially column-shaped shaft part and a pair of support parts at both ends of the shaft part; terminal electrodes that are respectively provided on the pair of support parts; and a wire that is wound around the shaft part and has end portions that are respectively connected to the terminal electrodes on the pair of support parts.

The inductor component exhibits an impedance value of 2100Ω or higher for an input signal having a frequency of 500 MHz.

With this configuration, the inductor component exhibits an impedance value of 2100Ω or higher for an input signal having a frequency of 500 MHz, and therefore a high impedance value is secured in a specific low-frequency region (500 MHz band) and the reduction of the impedance value in a high-frequency region (for example, 1 GHz band) is small. Therefore, the inductor component is suitable for use in a specific low-frequency region and the effect on use in a high-frequency region can be reduced.

Furthermore, in the inductor component, a width of the inductor component, in a direction parallel to a circuit board on which the inductor component is mounted using the terminal electrodes, among directions perpendicular to a first direction in which the shaft part extends, may be 0.36 mm or less.

With this configuration, an impedance value of 2100Ω or higher can be obtained for an input signal having a frequency of 500 MHz even though the inductor component is small in size.

Furthermore, in the inductor component, the width of the inductor component, in the direction parallel to the circuit board on which the inductor component is mounted using the terminal electrodes, among directions perpendicular to the first direction in which the shaft part extends, may be 0.33 mm or less.

With this configuration, an impedance value of 2100Ω or higher can be obtained for an input signal having a frequency of 500 MHz even though the inductor component is even smaller in size.

Furthermore, in the inductor component, the width of the inductor component, in the direction parallel to the circuit board on which the inductor component is mounted using the terminal electrodes, among directions perpendicular to the first direction in which the shaft part extends, may be 0.30 mm or less.

With this configuration, an impedance value of 2100Ω or higher can be obtained for an input signal having a frequency of 500 MHz even though the inductor component is even smaller in size.

In addition, the inductor component, a cross-sectional area of the shaft part in a direction perpendicular to a first direction in which the shaft part extends may lie within a range from 35% to 75% of a cross-sectional area of the support parts in a direction perpendicular to the first direction.

With this configuration, deterioration of the characteristics of the inductor component can be prevented by setting the lower limit of the cross sectional area of the shaft part as 35% or higher and the wire wound around the shaft part can be prevented from touching the terminal electrodes by setting the upper limit of the cross-sectional area of the shaft part as 75% or lower.

Furthermore, in the inductor component, the cross-sectional area of the shaft part may lie within a range from 40% to 70% of the cross-sectional area of the support parts.

With this configuration, deterioration of the characteristics of the inductor component and touching of the terminal electrodes by the wire can be more reliably prevented.

Furthermore, in the inductor component, the cross-sectional area of the shaft part may lie within a range from 45% to 65% of the cross-sectional area of the support parts.

With this configuration, deterioration of the characteristics of the inductor component and touching of the terminal electrodes by the wire can be more reliably prevented.

Furthermore, in the inductor component, the cross-sectional area of the shaft part may lie within a range from 50% to 60% of the cross-sectional area of the support parts.

With this configuration, deterioration of the characteristics of the inductor component and touching of the terminal electrodes by the wire can be more reliably prevented.

Furthermore, in the inductor component, the cross-sectional area of the support part may be 55% of the cross-sectional area of the support parts.

With this configuration, deterioration of the characteristics of the inductor component and touching of the terminal electrodes by the wire can be more reliably prevented.

Furthermore, the inductor component may exhibit an inductance value that lies within a range from 620 nH to 740 nH.

With this configuration, the inductor component has an effective inductance value when an impedance value of 2100Ω or higher is obtained for an input signal having a frequency of 500 MHz.

In addition, in the inductor component may exhibit an inductance value of 680 nH.

With this configuration, the inductor component exhibits an effective inductance value when an impedance value of 2100Ω or higher is obtained for an input signal having a frequency of 500 MHz.

The inductor component may exhibit an impedance value of 1100Ω or higher for an input signal having a frequency of 300 MHz.

With this configuration, an impedance value can be secured even in a lower frequency region.

In addition, the inductor component may exhibit an impedance value of 2850Ω or higher for an input signal having a frequency of 600 MHz.

With this configuration, the effect on use in a high-frequency region is further reduced.

Furthermore, the inductor component may exhibit an impedance value of 4800Ω or higher for an input signal having a frequency of 800 MHz.

With this configuration, the effect on use in a high-frequency region is further reduced.

In addition, the inductor component may have a self resonant frequency of 800 MHz or higher.

With this configuration, the effect on use in a high-frequency region is more reliably reduced.

In addition, the inductor component may have a self resonant frequency of 900 MHz or higher.

With this configuration, the effect on use in a high-frequency region is more reliably reduced.

Furthermore, in the inductor component, an inductance value per unit volume of the shaft part may be 11500 $nH/mm^3$.

With this configuration, the efficiency with which the inductance value is obtained can be improved and the inductor component can be made small in size.

Furthermore, in the inductor component, the inductance value per unit volume of the shaft part may be 19300 $nH/mm^3$.

With this configuration, the efficiency with which the inductance value is obtained can be improved and the inductor component can be made smaller in size.

Furthermore, in the inductor component, the number of turns of the wire wound around the shaft part may lie within a range from 20 to 22 turns.

With this configuration, the impedance value in a low-frequency region can be easily improved.

Furthermore, in the inductor component, the number of turns of the wire wound around the shaft part may be 21 turns.

With this configuration, the impedance value in a low-frequency region can be easily further improved.

Furthermore, in the inductor component, the wire may be wound around the shaft part in a single-layer winding.

With this configuration, stray capacitances can be reduced and radio-frequency characteristics can be improved.

In addition, in the inductor component, the terminal electrodes may include bottom surface electrode parts formed on bottom surfaces of the support parts and end surface electrode parts formed on end surfaces of the support parts so as to be continuous with the bottom surface electrode parts.

In each end surface electrode part, a center portion, which is at a center of the end surface in a width direction, may be taller than end portions, which are at ends of the end surface in the width direction.

With this configuration, the heights of the end surface electrode parts can be increased, and therefore the surface areas of the terminal electrodes can be increased and the strength with which the inductor component is fixed to a circuit board can be improved.

Furthermore, in the inductor component, an upper edge of each end surface electrode part may be substantially arc-shaped in an upwardly convex manner.

With this configuration, the surface areas of the terminal electrodes can be further increased and the strength with which the inductor component is fixed to a circuit board can be further improved.

Furthermore, in the inductor, in each end surface electrode part, a ratio of a height of the center portion, which is at the center of the end surface in the width direction, to a height of the end portions, which are at the ends of the end surface in the width direction, may be 1.1 or higher.

With this configuration, the surface areas of the terminal electrodes can be further increased and the strength with which the inductor component is fixed to a circuit board can be further improved.

Furthermore, in the inductor, in each end surface electrode part, a ratio of a height of the center portion, which is at a center of the end surface in the width direction, to a height of the end portions, which are at ends of the end surface in the width direction, may be 1.2 or higher.

With this configuration, the surface areas of the terminal electrodes can be further increased and the strength with which the inductor component is fixed to a circuit board can be further improved.

Furthermore, in the inductor, in each end surface electrode part, a ratio of a height of the center portion, which is at the center of the end surface in the width direction, to a height of the end portions, which are at the ends of the end surface in the width direction, may be 1.3 or higher.

With this configuration, the surface areas of the terminal electrodes can be further increased and the strength with which the inductor component is fixed to a circuit board can be further improved.

In addition, in the inductor component, the terminal electrodes may further include side surface electrode parts that are formed on side surfaces of the support parts so as to be continuous with the bottom surface electrode parts, and the side surface electrode parts may be formed so as to gradually increase in height from facing surfaces of the pair of support parts that face each other toward the end surfaces of the support parts.

With this configuration, the heights of the side surface electrode parts on the facing surface sides of the support parts can be made lower, and therefore the wire wound around the shaft part can be prevented from touching the terminal electrodes and the cross-sectional area of the shaft part can be increased and deterioration of the characteristics can be prevented.

Furthermore, in the inductor, a diameter of a conductive wire of the wire may lie in a range from 12 μm to 18 μm.

With this configuration, the winding density of the wire around the shaft part can be easily increased and it is easy to secure the inductance value in a low-frequency region.

Furthermore, in the inductor, the diameter of the conductive wire of the wire may lie in a range from 13 μm to 15 μm.

With this configuration, the winding density of the wire around the shaft part can be easily further increased and it is even easier to secure the inductance value in a low-frequency region.

Furthermore, in the inductor component, the diameter of the conductive wire of the wire may be 14 μm.

With this configuration, the winding density of the wire around the shaft part can be easily further increased and it is even easier to secure the inductance value in a low-frequency region.

Furthermore, in the inductor, a diameter of the wire may lie in a range from 16 μm to 22 μm.

With this configuration, the winding density of the wire around the shaft part can be easily increased and it is easy to secure the inductance value in a low-frequency region.

Furthermore, in the inductor, the diameter of the wire may lie in a range from 17 μm to 19 μm.

With this configuration, the winding density of the wire around the shaft part can be easily further increased and it is even easier to secure the inductance value in a low-frequency region.

Furthermore, in the inductor component, the diameter of the wire may be 18 μm.

With this configuration, the winding density of the wire around the shaft part can be easily further increased and it is even easier to secure the inductance value in a low-frequency region.

The inductor component according to the preferred embodiment of the present disclosure is suitable for use in a specific low-frequency region and the effect on use in a high-frequency region can be reduced.

Other features, elements, characteristics and advantages of the present disclosure will become more apparent from the following detailed description of preferred embodiments of the present disclosure with reference to the attached drawings.

DETAILED DESCRIPTION

Hereafter, inductor components according to aspects of the present disclosure will be described in detail by referring to illustrated embodiments. The drawings include schematic drawings and may not reflect the actual dimensions and proportions.

First Embodiment

Figure 1:
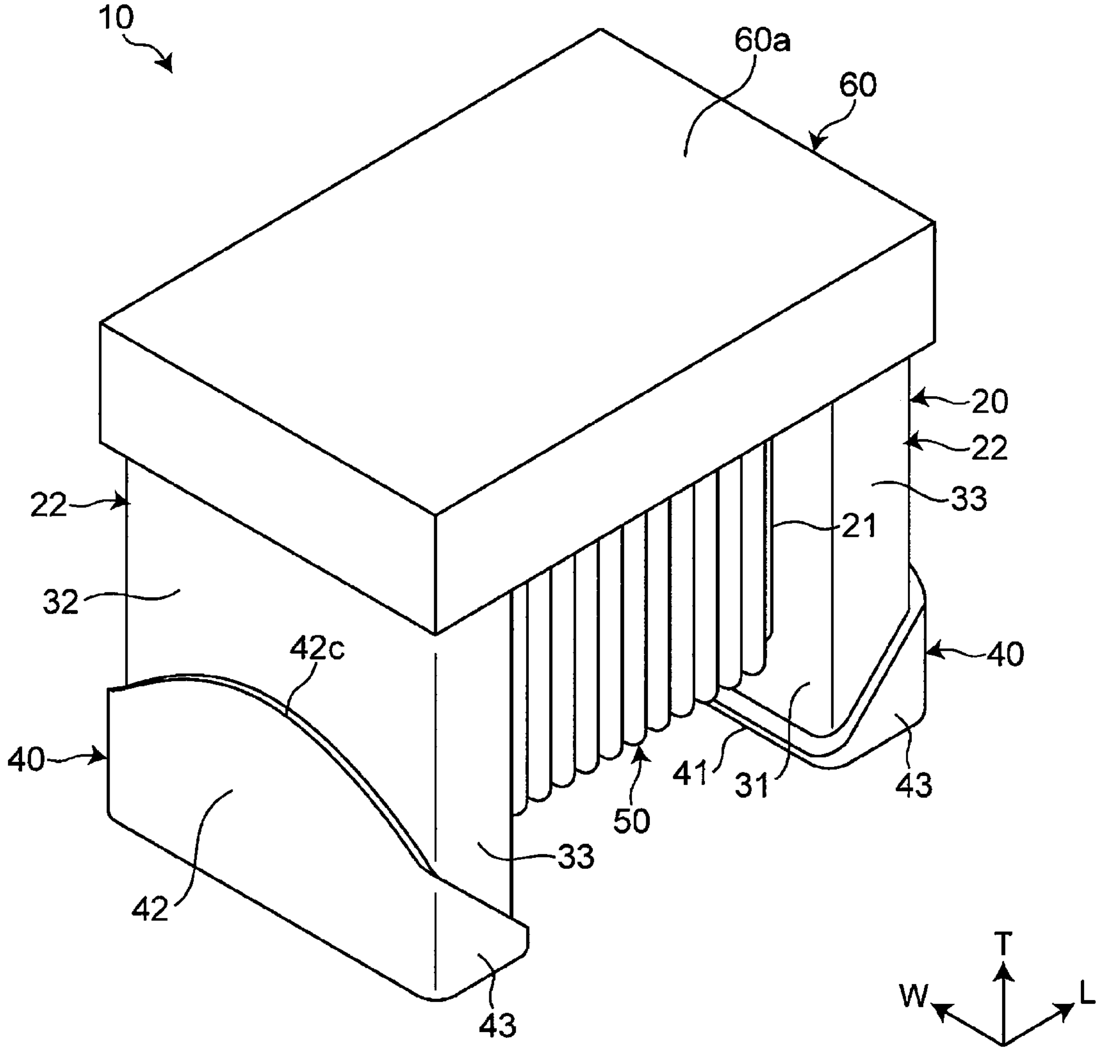
FIG. 1 is a perspective view illustrating an inductor component of a first embodiment.
Figure 2:
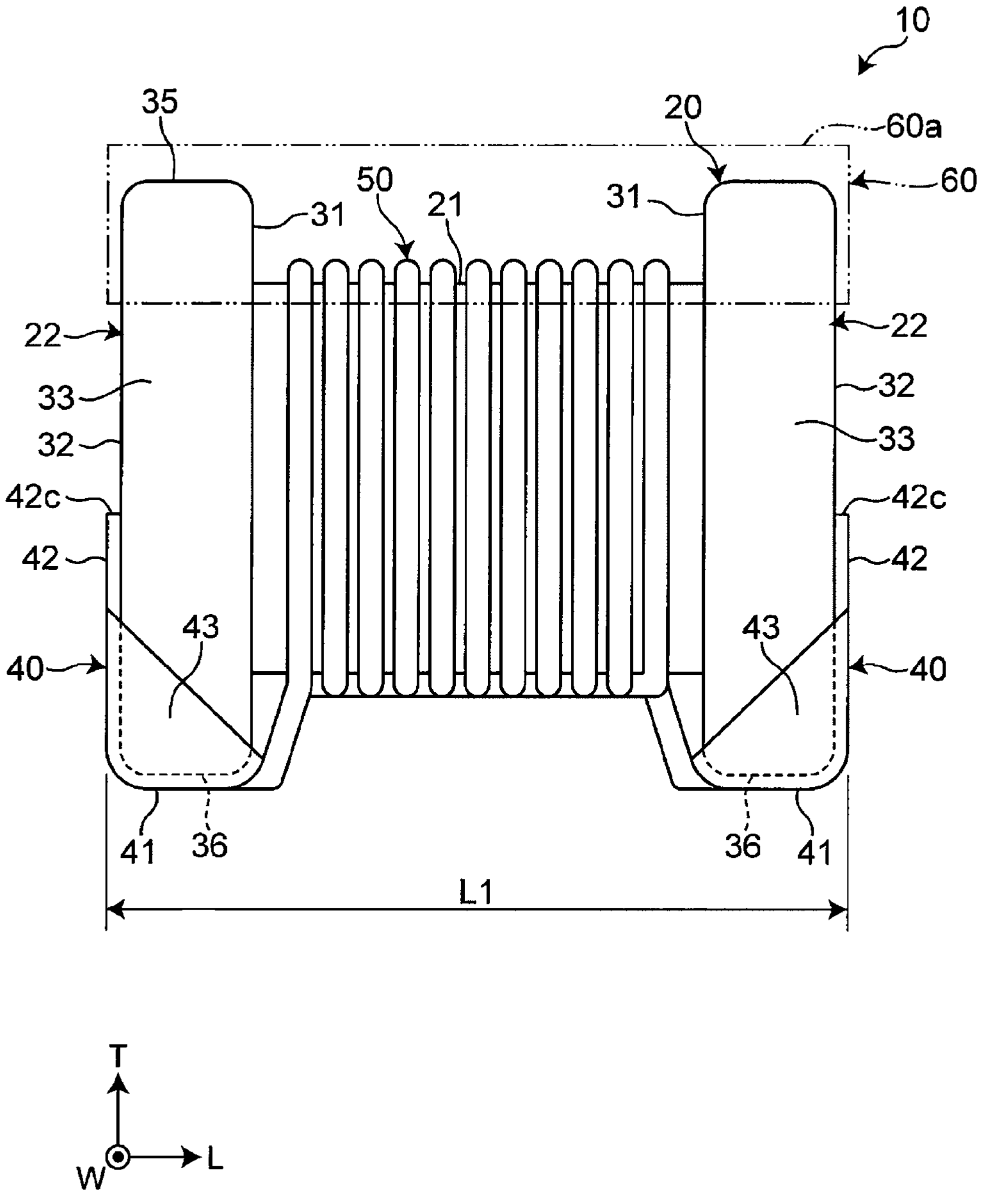
FIG. 2 is a front view of the inductor component.
Figure 3:
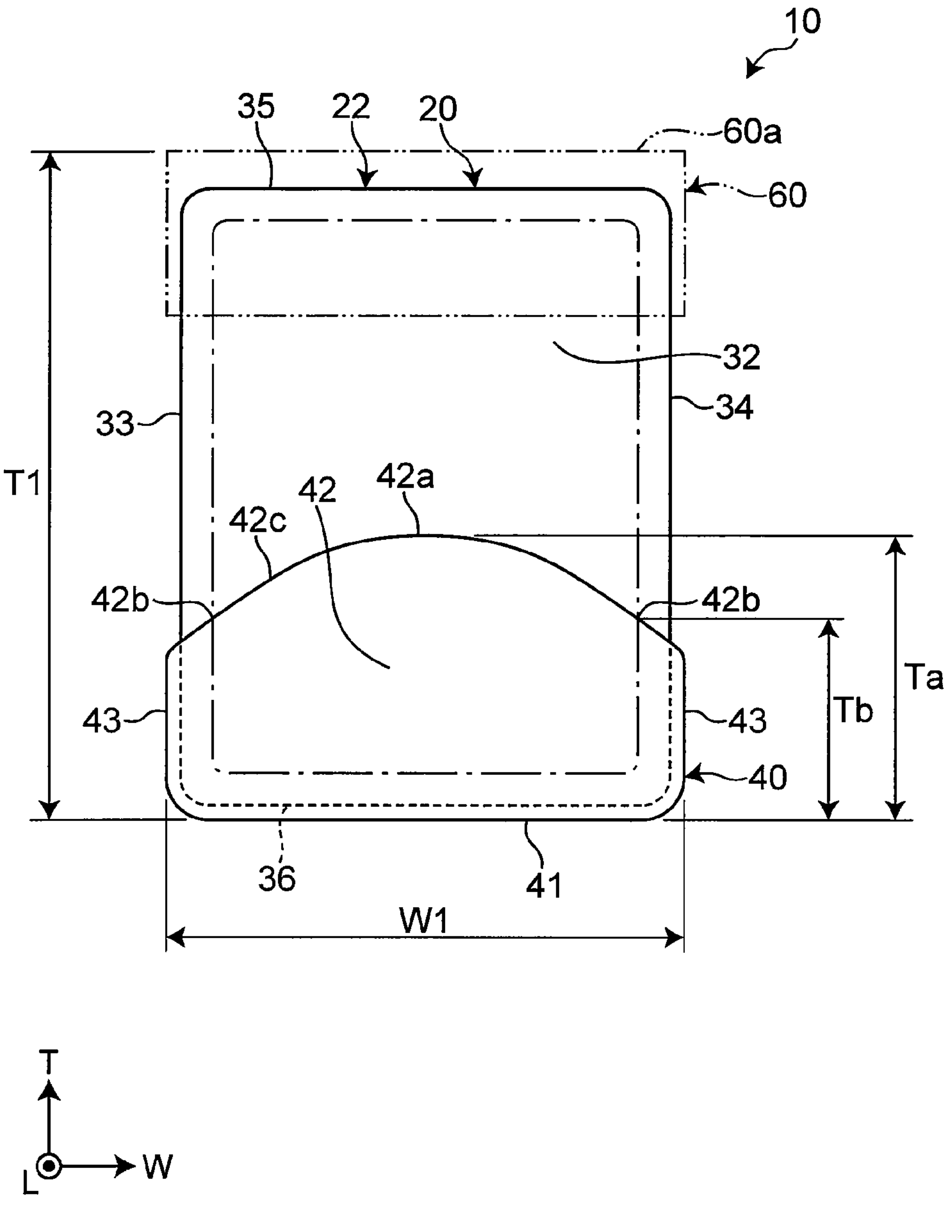
FIG. 3 is an end surface view of the inductor component.

FIG. 1 is a perspective view illustrating an inductor component of a first embodiment. FIG. 2 is a front view of the inductor component. FIG. 3 is an end surface view of the inductor component.

As illustrated in FIGS. 1, 2, and 3, an inductor component 10 includes a core 20, a pair of terminal electrodes 40, and a wire 50. The core 20 includes a substantially column-shaped shaft part 21 and a pair of support parts 22. The shaft part 21 is formed in a substantially rectangular parallelepiped shape. The pair of support parts 22 extend in a second direction, which is perpendicular to a first direction in which the shaft part 21 extends, from both ends of the shaft part 21. The support parts 22 support the shaft part 21 parallel to a mounting target (circuit board). The pair of support parts 22 are formed so as to be integrated with the shaft part 21.

The terminal electrodes 40 are formed on the support parts 22. The wire 50 is wound around the shaft part 21. The two end portions of the wire 50 are respectively connected to the terminal electrodes 40. The inductor component 10 is a wound-wire-type inductor.

The inductor component 10 exhibits an impedance value of 2100Ω or higher for an input signal having a frequency of 500 MHz. Improvement of the impedance value in a low-frequency region consisting of the 500 MHz band does not result in a significant trade-off with respect to improvement of the impedance value in a high-frequency region such as the 1 GHz band as discovered by the inventors of the present application. Therefore, a high impedance value is secured in a specific low-frequency region (500 MHz band) and the decrease of the impedance value in a high-frequency region (for example, 1 GHz band) is small. Thus, the inductor component 10 is suitable for use in a specific low-frequency region and is able to reduce the effect on use in a high-frequency region.

The inductor component 10 preferably exhibits an impedance value of 1100Ω or higher for an input signal having a frequency of 300 MHz, more preferably exhibits an impedance value of 2850Ω or higher for an input signal having a frequency of 600 MHz, and more preferably exhibits an impedance value of 4800Ω or higher for an input signal having a frequency of 800 MHz. As a result, impedance values greater than or equal to a certain level are secured in other specific low-frequency regions (300 MHz band and 600 MHz band) and the impedance value in another high-frequency region (800 MHz band) is not reduced, and therefore the inductor component 10 is more suitable for use in specific low-frequency regions and the effect on the use in a high-frequency region is reduced.

The inductor component 10 preferably exhibits an inductance value that lies within a range from 620 nH to 740 nH, and more preferably exhibits an inductance value of 680 nH. This inductance value is a value measured when the frequency is 10 MHz. Thus, when an impedance value of 2100Ω or higher is obtained for an input signal having a frequency of 500 MHz by setting the inductance value to lie within a fixed range, an effective inductance value is obtained.

The inductor component 10 preferably has a self resonant frequency of 800 MHz or higher and more preferably has a self resonant frequency of 900 MHz or higher. As a result, the effect on use of the inductor component 10 in a high-frequency region is more reliably reduced.

The inductor component 10 is formed in a substantially rectangular parallelepiped shape. In this specification, the term "rectangular parallelepiped shape" includes a rectangular parallelepiped shape having chamfered corners and edges and a rectangular parallelepiped shape having rounded corners and edges. In addition, irregularities and so forth may be formed on some or all of the main surfaces and side surfaces. Furthermore, opposite surfaces of the "rectangular parallelepiped shape" do not necessarily have to be perfectly parallel to each other and the opposite surfaces may instead be somewhat inclined with respect to each other.

In this specification, the direction in which the shaft part 21 extends is defined as a "length direction L (first direction), an up-down direction in FIGS. 2 and 3 among directions perpendicular to the "length direction L" is defined as a "height direction (thickness direction) T", and a direction (left-right in FIG. 3) that is perpendicular to both the "length direction L" and the "height direction T" is defined as a "width direction W". In addition, in this specification, "width direction" refers to a direction that is parallel to a circuit board when the inductor component 10 is mounted on the circuit board, that is, mounted using the terminal electrodes 40, among directions perpendicular to the length direction.

The size of the inductor component 10 in the length direction L (length L1) is preferably larger than 0 mm and less than or equal to 1.0 mm (i.e., from larger than 0 mm to 1.0 mm). The size of the inductor component 10 in the height direction T (height T1) is preferably larger than 0 mm and less than or equal to 0.8 mm (i.e., from larger than 0 mm to 0.8 mm).

The size of the inductor component 10 in the width direction W (width W1) is preferably larger than 0 mm and less than or equal to 0.6 mm (i.e., from larger than 0 mm to 0.6 mm). Furthermore, the width W1 is preferably 0.36 mm or less, more preferably 0.33 mm or less, and more preferably 0.30 mm or less. When the inductor component 10 is made small in size, for example, the width W1 is made less than or equal to 0.36 mm, it is more difficult to practically use the inductor component 10 in both a low-frequency region and a high-frequency region, and therefore realization of an impedance value of 2100Ω or higher for an input signal having a frequency of 500 MHz is more effectively exhibited.

The shaft part 21 is formed in a substantially rectangular parallelepiped shape that extends in the length direction L. The pair of support parts 22 are formed in plate-like shapes that are thin in the length direction L. The pair of support parts 22 are formed in substantially rectangular parallelepiped shapes that are longer in the height direction T than in the width direction W.

The pair of support parts 22 are formed so as to protrude from the periphery of the shaft part 21 in the height direction T and the width direction W. Specifically, the planar shape of each support part 22 when viewed in the length direction L is formed so as to protrude in the height direction T and the width direction W relative to the shaft part 21.

Each support part 22 has an inner surface 31 and an end surface 32 that face each other in the length direction L, a pair of side surfaces 33 and 34 that face each other in the width direction W, and a top surface 35 and a bottom surface 36 that face each other in the height direction T. The inner surface 31 of one support part 22 faces the inner surface 31 of the other support part 22.

As illustrated in the figures, in this specification, "bottom surface" refers to a surface that faces the circuit board when the inductor component 10 is mounted on a circuit board. In particular, the bottom surfaces of the support parts refer to the surfaces on the sides where the terminal electrodes are formed on both support parts. In addition, "end surface" refers to a surface of the support part that faces away from the shaft part. In addition, "side surface" refers to a surface that is adjacent to a bottom surface and an end surface.

A magnetic material (for example, a nickel (Ni)—zinc (Zn) ferrite or a magnesium (Mn)—Zn ferrite), alumina, a metal magnetic body, or the like can be used as the material of the core 20. The core 20 is obtained by molding and sintering a powder of these materials.

Figure 4:
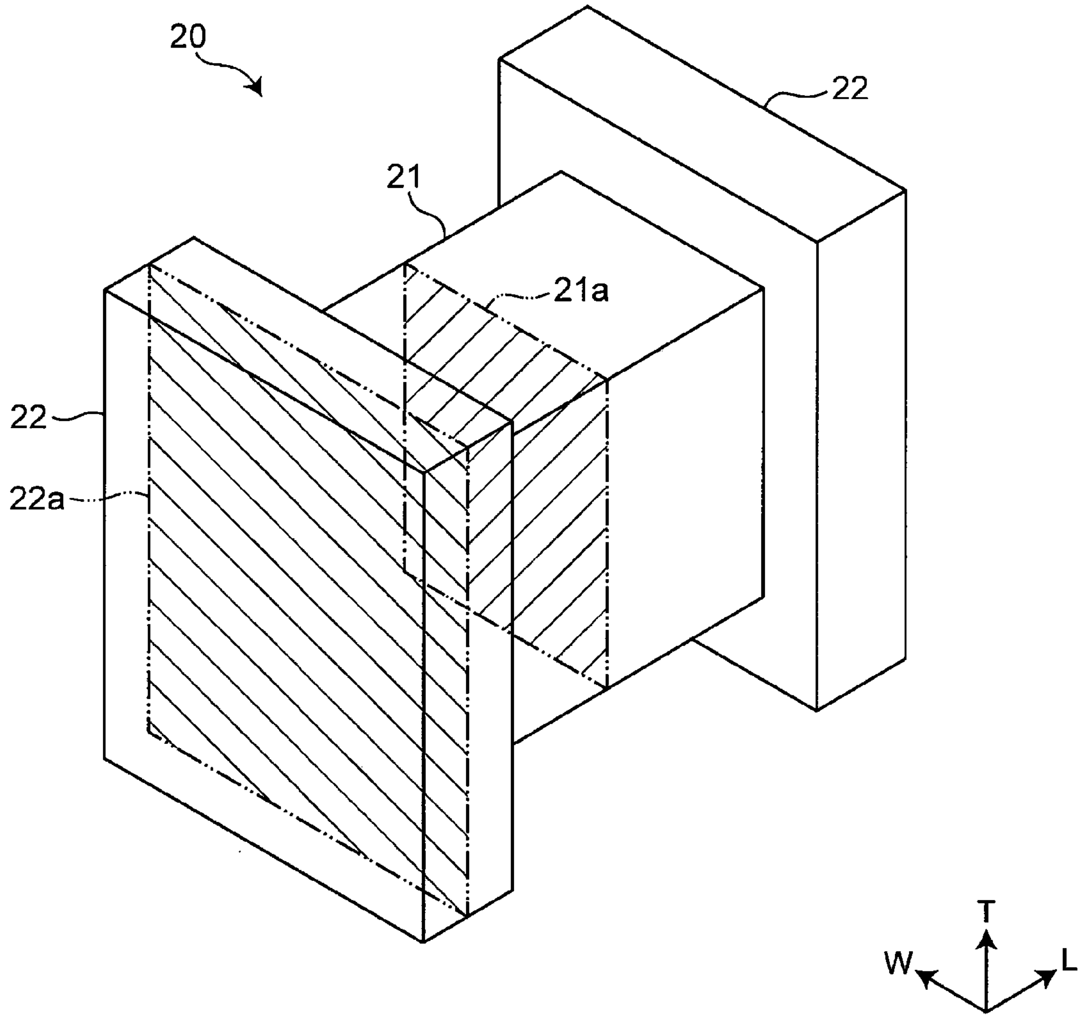
FIG. 4 is a schematic perspective view for explaining a cross section of a core.

As illustrated in FIG. 4, the area of a cross section 21*a* of the shaft part 21 in a direction perpendicular to the axial direction (length direction L) of the shaft part 21 preferably lies within a range from 35% to 75% of the area of a cross section 22*a* of the each support part 22 in a direction perpendicular to the axial direction. Thus, a lower limit is set on the thickness of the shaft part 21 by setting the ratio of the cross-sectional area of the shaft part 21 to 35% or higher, and as a result the saturation amount of magnetic flux passing through the core 20 is improved and deterioration of characteristics can be suppressed. On the other hand, an upper limit is set on the thickness of the shaft part 21 by setting the ratio of the cross-sectional area of the shaft part 21 to 75% or lower, and as a result, a situation in which the wire 50 wound around the shaft part 21 comes close to the bottom surfaces 36 of the support parts 22 and touches the terminal electrodes 40 can be prevented.

The cross-sectional area of the shaft part 21 is preferably 40% to 70%, more preferably 45% to 65%, and more preferably 50% to 60% of the cross-sectional area of each support part 22, and more preferably is 55% of the cross-sectional area of each support part 22. As a result, deterioration of characteristics and touching of the terminal electrodes 40 by the wire 50 can be better prevented.

The inductance value per unit volume of the shaft part 21 is preferably 11500 nH/mm$^3$ or higher. At this time, for example, the inductance value is 670 nH and the shaft part 21 has a length L of 0.44 mm, a width W of 0.30 mm, and a thickness T of 0.44 mm. As a result, the efficiency with which the inductance value is obtained can be improved and the inductor component 10 can be made small in size.

The inductance value per unit volume of the shaft part 21 is more preferably 19300 nH/mm$^3$ or higher. At this time, for example, the inductance value is 680 nH and the shaft part 21 has a length L of 0.44 mm, a width W of 0.25 mm, and a thickness T of 0.32 mm. As a result, the efficiency with which the inductance value is obtained can be improved and the inductor component 10 can be made small in size.

The wire 50 is wound around the shaft part 21. The two end portions of the wire 50 are respectively electrically connected to the terminal electrodes 40. For example, solder can be used to connect the wire 50 and the terminal electrodes 40 to each other.

The number of turns of the wire 50 preferably lies within a range from 20 to 22 turns and is more preferably 21 turns. Thus, the impedance value in the low-frequency region can be easily improved. That is, an impedance value of 2100Ω or higher can be easily realized for an input signal having a frequency of 500 MHz.

The wire 50 is preferably wound around the shaft part 21 in a single-layer winding. As a result, stray capacitances between portions of the wire 50 can be reduced and radio-frequency characteristics can be improved.

The wire 50 for example includes a conductive wire having a substantially circular cross section and a coating that covers the surface of the conductive wire. For example, a conductive material such as Cu or Ag can be used as the main constituent of the material of the conductive wire. For example, an insulating material such as polyurethane or polyester can be used as the material of the coating.

The diameter of the conductive wire of the wire 50 preferably lies within a range from 12 μm to 18 μm, more preferably lies within a range from 13 μm to 15 μm, and more preferably is 14 μm. In addition, the diameter of the wire 50 (i.e., the sum of the diameter of the conductive wire and the thickness of the coating) preferably lies within a range from 16 μm to 22 μm, more preferably lies within a range from 17 μm to 19 μm, and more preferably is 18 μm.

Thus, the winding density of the wire 50 around the shaft part 21 can be easily made high and it is easy to secure the inductance value in the low-frequency region by configuring the wire 50 and the conductive wire of the wire 50 to lie within the above ranges so as to realize a thin wire. In other words, the winding density can be secured by setting the upper limits of the diameters and the strength of the wire 50 can be secured by setting the lower limits of the diameters.

The terminal electrodes 40 include bottom surface electrode parts 41 that are formed on the bottom surfaces 36 of the support parts 22. The bottom surface electrode parts 41 are formed over entire bottom surfaces 36 of the support parts 22. The terminal electrodes 40 include end surface electrode parts 42 formed on the end surfaces 32 of the support parts 22. The end surface electrode parts 42 are formed so as to cover parts (lower parts) of the end surfaces 32 of the support parts 22. The end surface electrode parts 42 are formed so as to be continuous with the bottom surface electrode parts 41.

As illustrated in FIG. 3, the end surface electrode parts 42 are formed on the end surfaces 32 of the support parts 22 so that center portions 42*a* thereof, which are at the center in the width direction, are taller than end portions 42*b* thereof, which are at both ends in the width direction. Upper edges 42*c* of the end surface electrode parts 42 are substantially arc-shaped in an upwardly convex manner. Thus, the end surface electrode parts 42 can be increased in height and therefore the surface areas of the terminal electrodes 40 can be increased. Therefore, when the inductor component 10 is mounted on a circuit board using solder, the areas of contact between the terminal electrodes 40 and the solder can be made larger and the strength with which the inductor component 10 is fixed to the circuit board can be improved. Furthermore, since the upper edges 42*c* of the end surface electrode parts 42 are substantially arc-shaped, the surface areas of the terminal electrodes 40 can be made larger and the strength with which the inductor component 10 is fixed to the circuit board can be further improved.

In each end surface electrode part 42, the ratio of a height Ta of the center portion 42*a* to a height Tb of the end portions 42*b* is preferably 1.1 or higher, more preferably 1.2 or higher, and still more preferably 1.3 or higher. As a result, the surface area of the terminal electrodes 40 can be made even larger and the strength with which the inductor component 10 is fixed to the circuit board can be further improved.

The height of each end surface electrode part 42 is the length from the surface (lower end) of the bottom surface electrode part 41 to an end (upper end) of the end surface electrode part 42 measured along the height direction T when viewed from the end surface 32 side. Furthermore, in particular, the height Tb of each end portion 42*b* is the height of the width-direction end portion 42*b* along the planar part of the end surface 32. In FIG. 3, the end portions of the planar part of the end surface 32 are indicated by the one-dot chain line. The core 20 is chamfered so that the outer surfaces thereof (corners and ridges) have a curved roundness. The chamfering is performing using barrel finishing, for example. Since the position of the lower edge varies in the curved parts, variations are likely to occur in the heights of the end surface electrode parts 42. Therefore, the end portions 42*b* of each end surface electrode part 42 are assumed to correspond to the width-direction end portions of the planar part of the end surface 32. In addition, when the end portions of the planar part of the end surface 32 are unclear, the end portions 42*b* are assumed to be disposed at positions that are 50 μm inside from the side surfaces 33 and 34 of the support portions 22 in FIG. 3.

The terminal electrodes 40 include side surface electrode parts 43 that are formed on the side surfaces 33 and 34 of the support parts 22. The side surface electrode parts 43 are formed so as to cover parts (lower parts) of the side surfaces 33 of the support parts 22. The side surface electrode parts 43 are formed so as to be continuous with the bottom surface electrode parts 41 and the end surface electrode parts 42. The side surface electrode parts 43 are formed so as to gradually increase in height from the facing surfaces (inner surfaces 31) of the pair of support parts 22 toward the end surfaces 32 of the pair of support parts 22, i.e., so that the upper edges of the terminal electrodes 40 are slanted on the sides surface 33 of the support parts 22. The side surface electrode parts 43 are formed in the same manner on the side surfaces 34. With this configuration, the heights of the side surface electrode parts 43 on the facing surface sides of the support parts 22 can be made lower, and therefore the wire 50 wound around the shaft part 21 can be prevented from touching the terminal electrodes 40 and the cross-sectional area of the shaft part 21 can be increased, and deterioration of the characteristics can be prevented.

The terminal electrodes 40 each include a metal layer and a plating layer formed on the surface of the metal layer. Silver (Ag) may be used for the metal layer and tin (Sn) may be used as for the plating layer. In addition, a metal such as copper (Cu) or an alloy such as a nickel (Ni)—chromium (Cr) alloy or a Ni—Cu alloy may be used for the metal layer. In addition, Ni plating or two or more different types of plating materials may be used for the plating layer.

When forming each terminal electrode 40, the bottom surface 36 of the support part 22 of the core 20 is immersed in a conductive paste that will form the terminal electrode 40. The core 20 is then tilted so that the bottom surface 36 of the support part 22 faces obliquely upward. As a result, the conductive paste spreads along the end surface 32 and the terminal electrode 40 having the above-described shape can be formed.

The inductor component 10 further includes a cover member 60. The cover member 60 is applied to the top surface of the shaft part 21 and the top surfaces of the support parts 22 so as to cover the wire 50 wound around the shaft part 21. A top surface 60*a* of the cover member 60 is flat. For example, an epoxy resin can be used as the material of the cover member 60.

The cover member 60 ensures that the inductor component 10 can be reliably sucked by a suction nozzle when mounting the inductor component 10 on a circuit board, for example. In addition, the cover member 60 prevents the wire 50 from being damaged while being sucked by the suction nozzle. The inductance value (L value) of the inductor component 10 can be improved by using a magnetic material for the cover member 60. On the other hand, magnetic loss can be reduced and the Q value can be improved by using a non-magnetic material for the cover member 60.

Next, operation of the inductor component 10 will be described.

Figure 5:
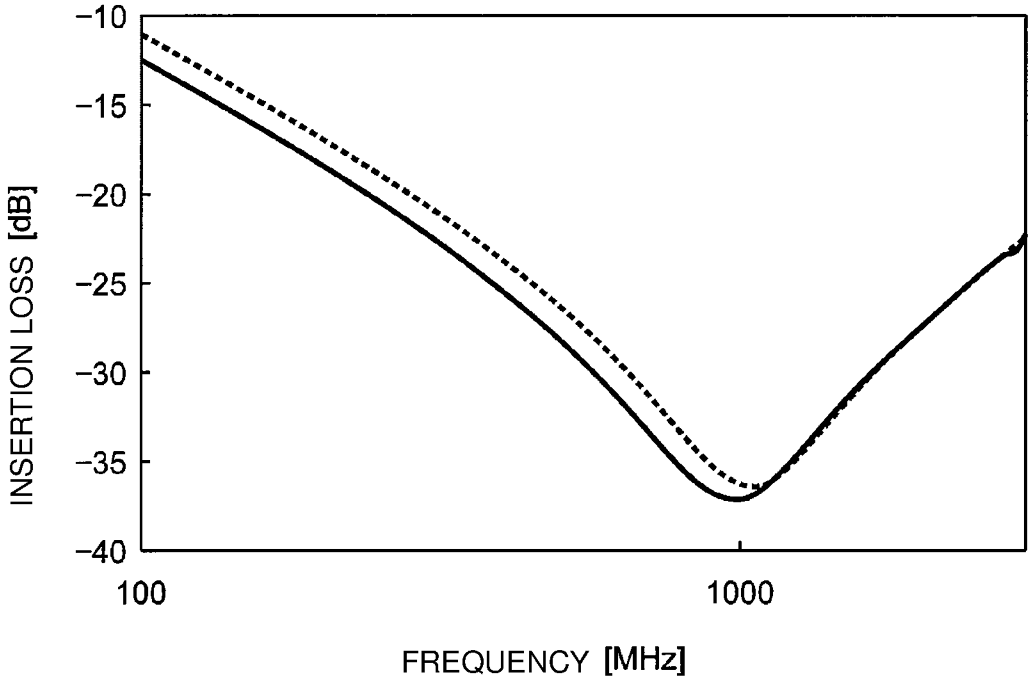
FIG. 5 is a graph illustrating the relationship between frequency and insertion loss.
Figure 6:
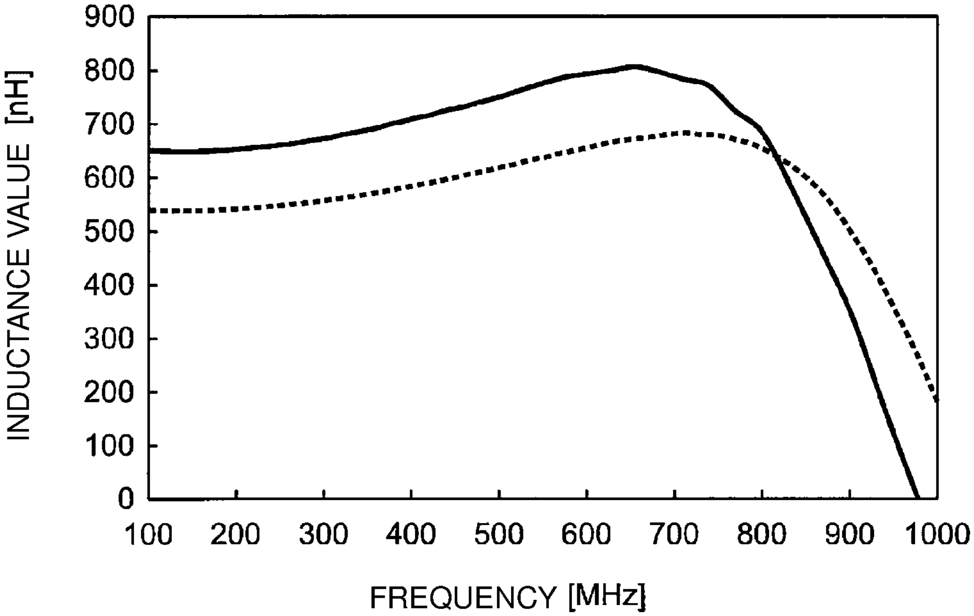
FIG. 6 is a graph illustrating the relationship between frequency and inductance value.
Figure 7:
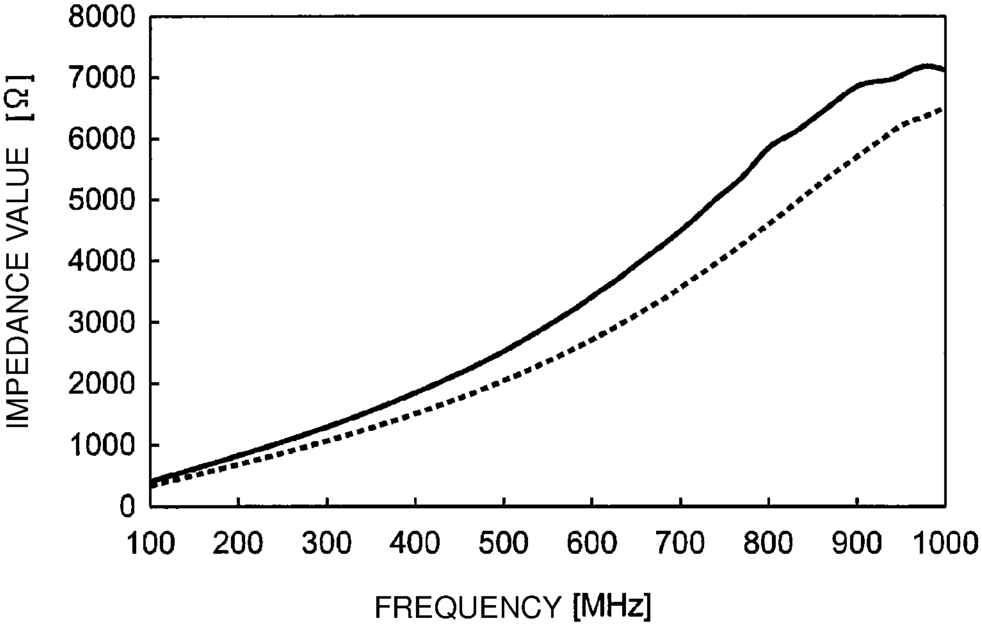
FIG. 7 is a graph illustrating the relationship between frequency and impedance value.

FIG. 5 is a graph illustrating the relationship between frequency and insertion loss. FIG. 6 is a graph illustrating the relationship between frequency and inductance value. FIG. 7 is a graph illustrating the relationship between frequency and impedance value. The solid lines represent the characteristics of the inductor component 10 of an example and the broken lines represent the characteristics of an inductor component of a comparative example.

Cores and terminal electrodes having the same shapes are used in the example and the comparative example. However, in the example, the number of turns of the wire is increased by using a thinner wire than in the comparative example in order to improve the impedance value at 500 MHz. Specifically, a core having dimensions of L/W/T=0.7 mm/0.3 mm/0.5 mm is used in both the example and the comparative example, a wire having a diameter of 19 μm is wound through 19 turns in the comparative example, and a wire having a diameter of 18 μm is wound through 21 turns in the example.

The inductance measurement conditions are as follows:

test signal level: around 0 dBm
electrode spaces: 0.2 mm
electrical length: 10.0 mm
adding weight: around 1 to 3 N
measuring fixture: KEYSIGHT 16197A.

As illustrated in FIG. 5, the insertion loss in the example is clearly larger than the insertion loss in the comparative example in a low-frequency region such as around 500 MHz, whereas the insertion loss in the example is identical to the insertion loss in the comparative example at high frequencies of over 1 GHz. The impedance value increases as the insertion loss becomes larger (toward lower side in the graph).

As illustrated in FIG. 6, the inductance value in the example is larger than the inductance value in the comparative example in a low-frequency region. This means that the example has a higher impedance value than the comparative example in a low-frequency region such as around 500 MHz.

As illustrated in FIG. 7, at a frequency of 500 MHz, the impedance value in the example is greater than or equal to 2100Ω and the impedance value in the comparative example is smaller than 2100Ω. Furthermore, the impedance value in the example is not smaller than the impedance value in the comparative example at a frequency of 1 GHz.

Therefore, according to the inductor component of the example, a very high impedance value of 2100Ω is maintained even in a low-frequency region around the 500 MHz band and the impedance value in the 1 GHz band does not decrease by a large amount, and therefore the inductor component is suitable for use in a specific low-frequency region and the effect on use in a high-frequency region can also be reduced.

The above-described core dimensions, wire diameter, and number of turns are merely an example of a way of realizing an impedance value of 2100Ω or higher at 500 MHz. Electrically, the index of 2100Ω or higher at 500 MHz is important, and the effect of the present disclosure can be obtained if the inductor component satisfies this condition. In other words, as a way of improving the impedance value at 500 MHz, in addition to changing the wire diameter and the number of turns of the wire as parameters as described above, the cross-sectional area of the shaft part (the inner diameter of the turns of the wire), the material of the core (particularly magnetic permeability in the 500 MHz band), the length of the part of the shaft part (coil length) around which the wire is wound, the positions of the terminal electrodes, and the areas of the terminal electrodes can be changed, and a combination of any two or more of these parameters may be used.

Second Embodiment

Figure 8:
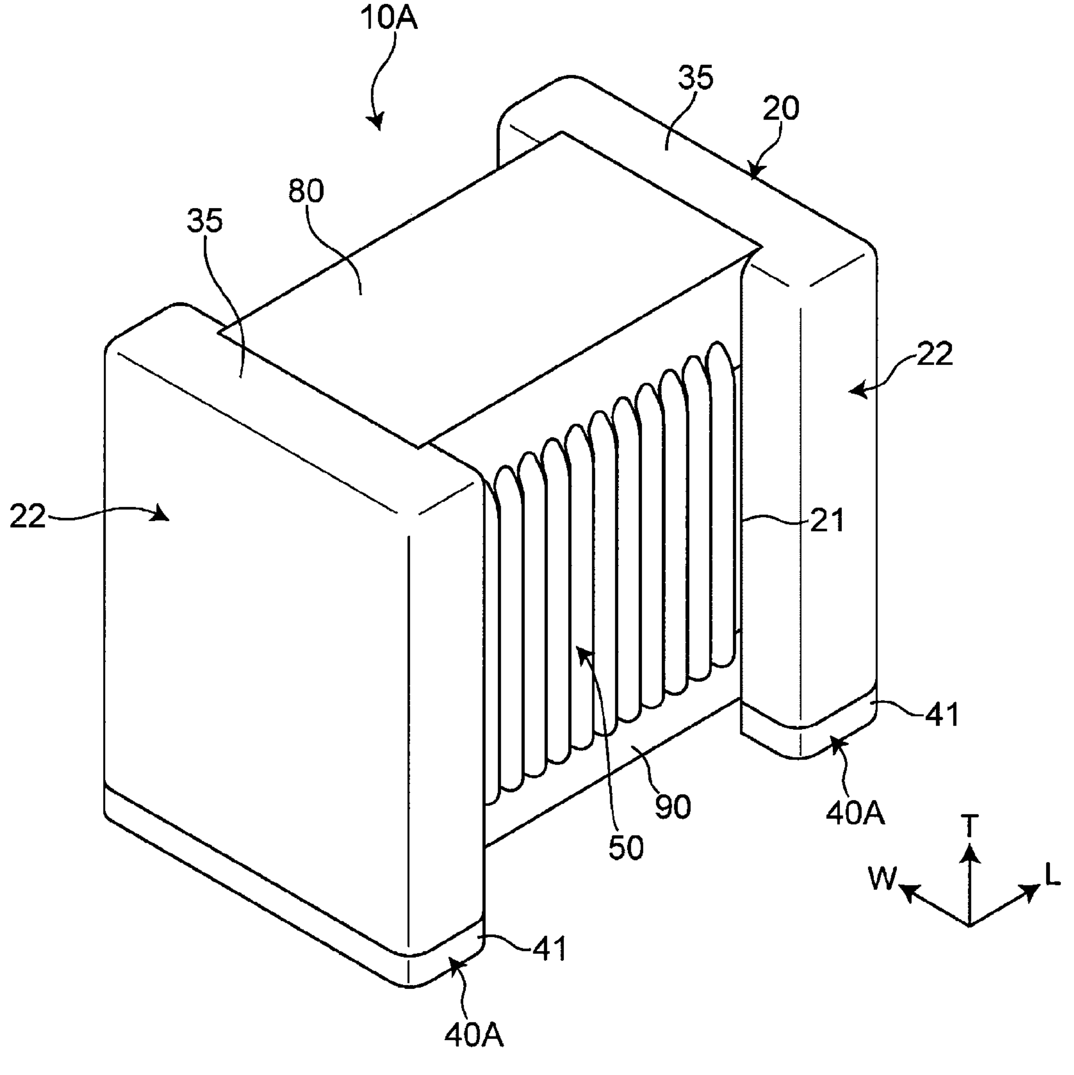
FIG. 8 is a perspective view illustrating an inductor component of a second embodiment.

FIG. 8 is a perspective view illustrating an inductor component of a second embodiment. The second embodiment differs from the first embodiment in terms of the configurations of the terminal electrodes and the cover member. These differences will be described below. The rest of the configuration is the same as in the first embodiment, and parts that are the same as in the first embodiment are denoted by the same symbols and description thereof is omitted.

As illustrated in FIG. 8, in an inductor component 10A of the second embodiment, terminal electrodes 40A consist of only the bottom surface electrode parts 41. Therefore, the structure of the terminal electrodes 40A is simpler.

The inductor component 10A has a top cover member 80 and a bottom cover member 90 instead of the cover member 60 of the first embodiment. The top cover member 80 is arranged between the pair of support parts 22 and covers the parts of the wire 50 on the top surface 35 side. The bottom cover member 90 is arranged between the pair of support parts 22 and covers the parts of the wire 50 on the bottom surface 36 side. The strength of the inductor component 10A can be improved by providing the top cover member 80 and the bottom cover member 90.

In addition, an inductor component of another embodiment of the present disclosure includes a core that includes a substantially column-shaped shaft part and a pair of support parts at both ends of the shaft part; terminal electrodes that are respectively provided on the pair of support parts; and a wire that is wound around the shaft part and has end portions that are respectively connected to the terminal electrodes on the pair of support parts.

The inductor component exhibits an impedance value of 2100Ω or higher for an input signal having a frequency of 500 MHz.

The cross-sectional area of the shaft part is 55% of the cross-sectional area of the support parts.

The inductor component exhibits an inductance value that lies within a range from 620 nH to 740 nH.

According to this embodiment, the inductor component exhibits an impedance value of 2100Ω or higher for an input signal having a frequency of 500 MHz, and therefore an impedance value is secured in a specific low-frequency region (500 MHz band) and the reduction in impedance value in a high-frequency region (1 GHz band) is small. Therefore, the inductor component is suitable for use in a specific low-frequency region and the effect on use in a high-frequency region can be reduced.

Furthermore, the cross-sectional area of the shaft part is 55% of the cross-sectional area of the support parts, and therefore deterioration of the characteristics and touching of the terminal electrodes by the wire can be prevented with more certainty.

Furthermore, the inductor component exhibits an inductance value that lies within a range from 620 nH to 740 nH, and therefore the inductor component exhibits an effective inductance value when an impedance value of 2100Ω or higher is obtained for an input signal having a frequency of 500 MHz.

In addition, an inductor component of another embodiment of the present disclosure includes a core that includes a substantially column-shaped shaft part and a pair of support parts at both ends of the shaft part; terminal electrodes that are respectively provided on the pair of support parts; and a wire that is wound around the shaft part and has end portions that are respectively connected to the terminal electrodes on the pair of support parts.

The inductor component exhibits an impedance value of 2100Ω or higher for an input signal having a frequency of 500 MHz.

The inductor component has a self resonant frequency of 900 MHz or higher.

The terminal electrodes include bottom surface electrode parts formed on bottom surfaces of the support parts and end surface electrode parts formed on end surfaces of the support parts so as to be continuous with the bottom surface electrode parts.

In each end surface electrode part, a center portion, which is at a center of the end surface in a width direction, is taller than end portions, which are at ends of the end surface in the width direction.

An upper edge of each end surface electrode part is substantially arc-shaped in an upwardly convex manner.

In each end surface electrode part, a ratio of a height of the center portion, which is at the center of the end surface in the width direction, to a height of the end portions, which are at the ends of the end surface in the width direction, is 1.2 or higher.

The diameter of a conductive wire of the wire is 14 μm.

According to this embodiment, the inductor component exhibits an impedance value of 2100Ω or higher for an input signal having a frequency of 500 MHz, and therefore an impedance value is secured in a specific low-frequency region (500 MHz band) and the reduction of the impedance value in a high-frequency region (for example, 1 GHz band) is small. Therefore, the inductor component is suitable for use in a specific low-frequency region and the effect on use in a high-frequency region can be reduced.

In addition, the inductor component has a self resonant frequency of 900 MHz or higher, and therefore the effect on use in a high-frequency region is more reliably reduced.

Furthermore, in each end surface electrode part, since the center portion, which is at the center of the end surface in the width direction, is taller than the end portions, which are at the ends of the end surface in the width direction, and the upper edges of the end surface electrode parts are substantially arc-shaped in an upwardly convex manner, the heights of the end surface electrode parts can be made larger, and as a result, the surface areas of the terminal electrodes can be increased and the strength with which the inductor component is fixed to a circuit board can be improved.

Furthermore, in each end surface electrode part, since the ratio of the height of the center portion, which is at the center of the end surface in the width direction, to the height of the end portions, which are at the ends of the end surface in the width direction, is 1.2 or higher, the surface area of the terminal electrodes can be further increased and the strength with which the inductor component is fixed to a circuit board can be further improved.

In addition, since the diameter of the conductive wire of the wire is 14 μm, the winding density of the wire around the shaft part can be made higher and it is easier to secure the inductance value in the low-frequency region.

In addition, an inductor component of another embodiment of the present disclosure includes a core that includes a substantially column-shaped shaft part and a pair of support parts at both ends of the shaft part; terminal electrodes that are respectively provided on the pair of support parts; and a wire that is wound around the shaft part and has end portions that are respectively connected to the terminal electrodes on the pair of support parts.

The inductor component exhibits an impedance value of 2100Ω or higher for an input signal having a frequency of 500 MHz.

A width that includes the terminal electrodes in a direction parallel to a circuit board on which the inductor component is mounted using the terminal electrodes, among directions perpendicular to a first direction in which the shaft part extends, is 0.30 mm or less.

The inductor component exhibits an inductance value of 680 nH.

The number of turns of the wire wound around the shaft part is 21 turns.

The wire is wound around the shaft part in a single-layer winding.

According to this embodiment, the inductor component exhibits an impedance value of 2100Ω or higher for an input signal having a frequency of 500 MHz, and therefore an impedance value is secured in a specific low-frequency region (500 MHz band) and the reduction of the impedance value in a high-frequency region (for example, 1 GHz band) is small. Therefore, the inductor component is suitable for use in a specific low-frequency region and the effect on use in a high-frequency region can be reduced.

Furthermore, since the width including the terminal electrodes in a direction parallel to a circuit board on which the inductor component is mounted using the terminal electrodes, among directions perpendicular to the first direction in which the shaft part extends, is less than or equal to 0.30 mm, an impedance value of 2100Ω or higher can be obtained for an input signal with a frequency of 500 MHz even when the inductor component is even smaller in size.

In addition, the inductor component exhibits an inductance value of 680 nH, and therefore the inductor component has an effective inductance value when an impedance value of 2100Ω or higher is obtained for an input signal having a frequency of 500 MHz.

Furthermore, since the number of turns of the wire wound around the shaft part is 21 turns, the impedance value in the low-frequency region can be easily improved.

In addition, since the wire is wound around the shaft part in a single-layer winding, stray capacitances can be made small and radio-frequency characteristics can be improved.

In addition, an inductor component of another embodiment of the present disclosure includes a core that includes a substantially column-shaped shaft part and a pair of support parts at both ends of the shaft part; terminal electrodes that are respectively provided on the pair of support parts; and a wire that is wound around the shaft part and has end portions that are respectively connected to the terminal electrodes on the pair of support parts.

The inductor component exhibits an impedance value of 2100Ω or higher for an input signal having a frequency of 500 MHz.

A width that includes the terminal electrodes in a direction parallel to a circuit board on which the inductor component is mounted using the terminal electrodes, among directions perpendicular to a first direction in which the shaft part extends, is 0.30 mm or less.

A cross-sectional area of the shaft part is 55% of a cross-sectional area of the support parts.

The inductor component exhibits an inductance value of 680 nH.

The inductor component has a self resonant frequency of 900 MHz or higher.

An inductance value per unit volume of the shaft part is 11500 $nH/mm^3$ or higher.

The number of turns of the wire wound around the shaft part is 21 turns.

The wire is wound around the shaft part in a single-layer winding.

The terminal electrodes include bottom surface electrode parts formed on bottom surfaces of the support parts and end surface electrode parts formed on end surfaces of the support parts so as to be continuous with the bottom surface electrode parts.

In each end surface electrode part, a center portion, which is at a center of the end surface in a width direction, is taller than end portions, which are at ends of the end surface in the width direction.

An upper edge of each end surface electrode part is substantially arc-shaped in an upwardly convex manner.

In each end surface electrode part, a ratio of a height of the center portion, which is at the center of the end surface in the width direction, to a height of the end portions, which are at the ends of the end surface in the width direction, is 1.2 or higher.

The diameter of a conductive wire of the wire is 14 μm.

According to this embodiment, the inductor component exhibits an impedance value of 2100Ω or higher for an input signal having a frequency of 500 MHz, and therefore an impedance value is secured in a specific low-frequency region (500 MHz band) and the reduction of the impedance value in a high-frequency region (for example, 1 GHz band) is small. Therefore, the inductor component is suitable for use in a specific low-frequency region and the effect on use in a high-frequency region can be reduced.

Furthermore, since the width including the terminal electrodes in a direction parallel to a circuit board on which the inductor component is mounted using the terminal electrodes, among directions perpendicular to the first direction in which the shaft part extends, is less than or equal to 0.30 mm, an impedance value of 2100Ω or higher can be obtained for an input signal with a frequency of 500 MHz even when the inductor component is even smaller in size.

Furthermore, the cross-sectional area of the shaft part is 55% of the cross-sectional area of the support parts, and therefore deterioration of the characteristics and touching of the terminal electrodes by the wire can be prevented with more certainty.

In addition, the inductor component exhibits an inductance value of 680 nH, and therefore the inductor component has an effective inductance value when an impedance value of 2100Ω or higher is obtained for an input signal having a frequency of 500 MHz.

In addition, the inductor component has a self resonant frequency of 900 MHz or higher, and therefore the effect on use in a high-frequency region is more reliably reduced.

Furthermore, the inductance value per unit volume of the shaft part is 11500 $nH/mm^3$ or higher, and therefore the efficiency with which the inductance value is obtained can be improved and the inductor component can be made small in size.

Furthermore, since the number of turns of the wire wound around the shaft part is 21 turns, the impedance value in the low-frequency region can be easily improved.

In addition, since the wire is wound around the shaft part in a single-layer winding, stray capacitances can be made small and radio-frequency characteristics can be improved.

Furthermore, in each end surface electrode part, since the center portion, which is at the center of the end surface in the width direction, is taller than the end portions, which are at the ends of the end surface in the width direction, and the upper edges of the end surface electrode parts are substantially arc-shaped in an upwardly convex manner, the heights of the end surface electrode parts can be made larger, and as a result, the surface areas of the terminal electrodes can be increased and the strength with which the inductor component is fixed to a circuit board can be improved.

Furthermore, in each end surface electrode part, since the ratio of the height of the center portion, which is at the center of the end surface in the width direction, to the height of the end portions, which are at the ends of the end surface in the width direction, is 1.2 or higher, the surface area of the terminal electrodes can be further increased and the strength with which the inductor component is fixed to a circuit board can be further improved.

In addition, since the diameter of the conductive wire of the wire is 14 μm, the winding density of the wire around the shaft part can be easily increased and it is easy to secure the inductance value in the low-frequency region.

The present disclosure is not limited to the above-described embodiments and design changes can be made within a range that does not depart from the gist of the present disclosure. For example, the characteristic features of the first and second embodiments may be combined with each other in various ways. Furthermore, appropriate design changes may be made to the shape of the core and the shapes of the terminal electrodes. In addition, the cover member may be omitted. Furthermore, the wire is wound around the shaft part in a single-layer winding, but the wire may instead be wound around the shaft part in a multiple layer winding.

While preferred embodiments of the disclosure have been described above, it is to be understood that variations and modifications will be apparent to those skilled in the art without departing from the scope and spirit of the disclosure. The scope of the disclosure, therefore, is to be determined solely by the following claims.

What is claimed is:

1. An inductor component comprising:

a core that includes a substantially column-shaped shaft part and a pair of support parts at both ends of the shaft part;

terminal electrodes that are respectively provided on the pair of support parts; and a wire that is wound around the shaft part and has end portions that are respectively connected to the terminal electrodes on the pair of support parts;

wherein the inductor component exhibits an impedance value of 2100Ω or higher for an input signal having a frequency of 500 MHz, the terminal electrodes include bottom surface electrode parts formed on bottom surfaces of the support parts and end surface electrode parts formed on end surfaces of the support parts so as to be continuous with the bottom surface electrode parts, in each end surface electrode part, a center portion, which is at a center of the end surface in a width direction, is higher than end portions, which are at ends of the end surface in the width direction, and upper edges of the end surface electrode parts are substantially arc-shaped in an upwardly convex manner.

2. The inductor component according to claim 1, wherein a width of the inductor component in a direction parallel to a circuit board on which the inductor component is mounted using the terminal electrodes, among directions perpendicular to a first direction in which the shaft part extends, is 0.36 mm or less.

3. The inductor component according to claim 2, wherein the width of the inductor component in a direction parallel to a circuit board on which the inductor component is mounted using the terminal electrodes, among directions perpendicular to the first direction in which the shaft part extends, is 0.33 mm or less.

4. The inductor component according to claim 3, wherein the width of the inductor component in a direction parallel to a circuit board on which the inductor component is mounted using the terminal electrodes, among directions perpendicular to the first direction in which the shaft part extends, is 0.30 mm or less.

5. The inductor component according to claim 1, wherein a cross-sectional area of the shaft part in a direction perpendicular to a first direction in which the shaft part extends lies within a range from 35% to 75% of a cross-sectional area of the support parts in a direction perpendicular to the first direction.

6. The inductor component according to claim 5, wherein the cross-sectional area of the shaft part lies within a range from 40% to 70% of the cross-sectional area of the support parts.

7. The inductor component according to claim 6, wherein the cross-sectional area of the shaft part lies within a range from 45% to 65% of the cross-sectional area of the support parts.

8. The inductor component according to claim 7, wherein the cross-sectional area of the shaft part lies within a range from 50% to 60% of the cross-sectional area of the support parts.

9. The inductor component according to claim 8, wherein the cross-sectional area of the shaft part is 55% of the cross-sectional area of the support parts.

10. The inductor component according to claim 1, wherein the inductor component exhibits an inductance value that lies within a range from 620 nH to 740 nH.

11. The inductor component according to claim 10, wherein the inductor component exhibits an inductance value of 680 nH.

12. The inductor component according to claim 1, wherein the inductor component exhibits an impedance value of 1100Ω or higher for an input signal having a frequency of 300 MHz.

13. The inductor component according to claim 12, wherein the inductor component exhibits an impedance value of 2850Ω or higher for an input signal having a frequency of 600 MHz.

14. The inductor component according to claim 13, wherein the inductor component exhibits an impedance value of 4800Ω or higher for an input signal having a frequency of 800 MHz.

15. The inductor component according to claim 1, wherein the inductor component has a self resonant frequency of 800 MHz or higher.

16. The inductor component according to claim 15, wherein the inductor component has a self resonant frequency of 900 MHz or higher.

17. The inductor component according to claim 1, wherein an inductance value per unit volume of the shaft part is 11500 $nH/mm^3$ or higher.

18. The inductor component according to claim 17, wherein an inductance value per unit volume of the shaft part is 19300 $nH/mm^3$ or higher.

19. The inductor component according to claim 1, wherein a number of turns of the wire wound around the shaft part lies within a range from 20 to 22 turns.

20. The inductor component according to claim 19, wherein the number of turns of the wire wound around the shaft part is 21 turns.

21. The inductor component according to claim 1, wherein the wire is wound around the shaft part in a single-layer winding.

22. The inductor component according to claim 1, wherein in each end surface electrode part, a ratio of a height of the center portion, which is at the center of the end surface in the width direction, to a height of the end portions, which are at the ends of the end surface in the width direction, is 1.1 or higher.

23. The inductor component according to claim 1, wherein in each end surface electrode part, a ratio of a height of the center portion, which is at the center of the end surface in the width direction, to a height of the end portions, which are at the ends of the end surface in the width direction, is 1.2 or higher.

24. The inductor component according to claim 1, wherein in each end surface electrode part, a ratio of a height of the center portion, which is at the center of the end surface in the width direction, to a height of the end portions, which are at the ends in the width direction, is 1.3 or higher.

25. The inductor component according to claim 1, wherein the terminal electrodes further include side surface electrode parts that are formed on side surfaces of the support parts so as to be continuous with the bottom surface electrode parts, and the side surface electrode parts are formed so as to gradually increase in height from facing surfaces of the pair of support parts that face each other toward the end surfaces of the support parts.

26. The inductor component according to claim 1, wherein a diameter of a conductive wire of the wire lies within a range from 12 μm to 18 μm.

27. The inductor component according to claim 26, wherein the diameter of the conductive wire of the wire lies within a range from 13 μm to 15 μm.

28. The inductor component according to claim 27, wherein the diameter of the conductive wire of the wire is 14 μm.

29. The inductor component according to claim 1, wherein a diameter of the wire lies within a range from 16 μm to 22 μm.

30. The inductor component according to claim 29, wherein the diameter of the wire lies within a range from 17 μm to 19 μm.

31. The inductor component according to claim 30, wherein the diameter of the wire is 18 μm.

32. An inductor component comprising:

a core that includes a substantially column-shaped shaft part and a pair of support parts at both ends of the shaft part;

terminal electrodes that are respectively provided on the pair of support parts; and a wire that is wound around the shaft part and has end portions that are respectively connected to the terminal electrodes on the pair of support parts, and a diameter of a conductive wire of the wire is 14 μm;

wherein the inductor component exhibits an impedance value of 2100Ω or higher for an input signal having a frequency of 500 MHz, the inductor component has a self resonant frequency of 900 MHz or higher, the terminal electrodes include bottom surface electrode parts formed on bottom surfaces of the support parts and end surface electrode parts formed on end surfaces of the support parts so as to be continuous with the bottom surface electrode parts, in each end surface electrode part, a center portion, which is at a center of the end surface in a width direction, is taller than end portions, which are at ends of the end surface in the width direction, an upper edge of each end surface electrode part is substantially arc-shaped in an upwardly convex manner, and in each end surface electrode part, a ratio of a height of the center portion, which is at the center of the end surface in the width direction, to a height of the end portions, which are at the ends of the end surface in the width direction, is 1.2 or higher.

33. An inductor component comprising:

a core that includes a substantially column-shaped shaft part and a pair of support parts at both ends of the shaft part;

terminal electrodes that are respectively provided on the pair of support parts; and a wire that is wound around the shaft part in a single-layer winding and has end portions that are respectively connected to the terminal electrodes on the pair of support parts, a diameter of a conductive wire of the wire is 14 μm, and a number of turns of the wire wound around the shaft part is 21 turns;

wherein the inductor component exhibits an impedance value of 2100Ω or higher for an input signal having a frequency of 500 MHz, a width that includes the terminal electrodes in a direction parallel to a circuit board on which the inductor component is mounted using the terminal electrodes, among directions perpendicular to a first direction in which the shaft part extends, is 0.30 mm or less, a cross-sectional area of the shaft part is 55% of a cross-sectional area of the support parts, the inductor component exhibits an inductance value of 680 nH, the inductor component has a self resonant frequency of 900 MHz or higher, an inductance value per unit volume of the shaft part is 11500 nH/mm$^3$ or higher, the terminal electrodes include bottom surface electrode parts formed on bottom surfaces of the support parts and end surface electrode parts formed on end surfaces of the support parts so as to be continuous with the bottom surface electrode parts, in each end surface electrode part, a center portion, which is at a center of the end surface in a width direction, is taller than end portions, which are at ends of the end surface in the width direction, an upper edge of each end surface electrode part is substantially arc-shaped in an upwardly convex manner, and in each end surface electrode part, a ratio of a height of the center portion, which is at the center of the end surface in the width direction, to a height of the end portions, which are at the ends of the end surface in the width direction, is 1.2 or higher.

* * * * *